United States Patent
Smith

(10) Patent No.: US 7,747,486 B1
(45) Date of Patent: Jun. 29, 2010

(54) FINANCIAL ANALYSIS SYSTEM INTERFACE

(76) Inventor: James Kemp Smith, 424 Lewis Wharf, Boston, MA (US) 02110

( * ) Notice: Subject to any disclaimer, the term of this patent is extended or adjusted under 35 U.S.C. 154(b) by 0 days.

(21) Appl. No.: 09/567,449

(22) Filed: May 8, 2000

(51) Int. Cl.
G06Q 40/00 (2006.01)

(52) U.S. Cl. .................. 705/35; 705/35 R; 705/36 T; 705/37; 345/418

(58) Field of Classification Search ............. 705/35–40; 345/379–382, 418
See application file for complete search history.

(56) References Cited

U.S. PATENT DOCUMENTS

| | | | | |
|---|---|---|---|---|
| 4,486,853 A * | 12/1984 | Parsons | ................... | 345/418 |
| 5,339,392 A * | 8/1994 | Risberg et al. | ............... | 345/762 |
| 5,611,040 A * | 3/1997 | Brewer et al. | ............... | 715/860 |
| 5,615,306 A * | 3/1997 | Bigus | ........................... | 706/44 |
| 5,675,752 A * | 10/1997 | Scott et al. | ................... | 715/866 |
| 5,774,878 A * | 6/1998 | Marshall | .................... | 705/36 R |
| 5,892,905 A * | 4/1999 | Brandt et al. | ................. | 726/11 |
| 5,914,715 A * | 6/1999 | Sasaki | ........................ | 715/803 |
| 6,141,699 A * | 10/2000 | Luzzi et al. | ................. | 719/331 |
| 6,216,237 B1 * | 4/2001 | Klemm et al. | ............... | 714/38 |
| 6,289,299 B1 * | 9/2001 | Daniel et al. | .................. | 703/21 |
| 6,408,282 B1 * | 6/2002 | Buist | ........................... | 705/37 |
| 6,510,419 B1 * | 1/2003 | Gatto | ....................... | 705/36 R |
| 6,577,323 B1 * | 6/2003 | Jamieson et al. | ............ | 715/700 |
| 6,647,410 B1 * | 11/2003 | Scimone et al. | ............. | 709/206 |
| 6,738,964 B1 * | 5/2004 | Zink et al. | ................... | 717/105 |
| 7,085,817 B1 * | 8/2006 | Tock et al. | ................... | 709/217 |
| 7,287,230 B2 * | 10/2007 | Austin et al. | ................. | 715/763 |
| 7,349,837 B2 * | 3/2008 | Martin et al. | ................. | 703/22 |
| 2002/0070968 A1 * | 6/2002 | Austin et al. | ................. | 345/764 |
| 2002/0138390 A1 * | 9/2002 | May | ........................... | 705/37 |
| 2006/0218242 A1 * | 9/2006 | Tock et al. | ................... | 709/217 |
| 2007/0199076 A1 * | 8/2007 | Rensin et al. | ................. | 726/27 |
| 2008/0104542 A1 * | 5/2008 | Cohen et al. | ................. | 715/810 |
| 2008/0120129 A1 * | 5/2008 | Seubert et al. | ................. | 705/1 |
| 2008/0301562 A1 * | 12/2008 | Berger et al. | ................. | 715/733 |

* cited by examiner

*Primary Examiner*—Narayanswamy Subramanian
(74) *Attorney, Agent, or Firm*—Cesari and McKenna, LLP

(57) ABSTRACT

A user interface provides a financial analysis system for real time monitoring of market conditions for a portfolio of stocks or other financial instruments. The interface presents three unique panels, which, upon selection by the user, provide different representations of data with respect to the portfolio or a selected portion of the portfolio. The user can rapidly cycle among these panels by activating icons. Further, the user can quickly retrieve additional data for a given stock from any of a variety of user-selectable sources by activating additional icons.

15 Claims, 5 Drawing Sheets

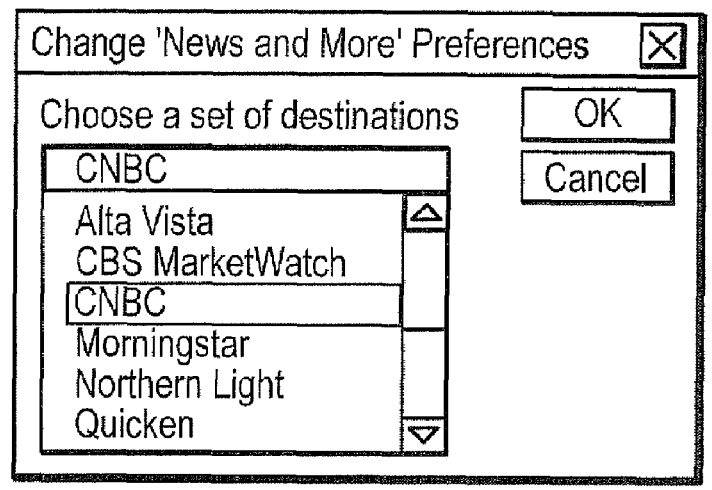
FIG. 2A(1)
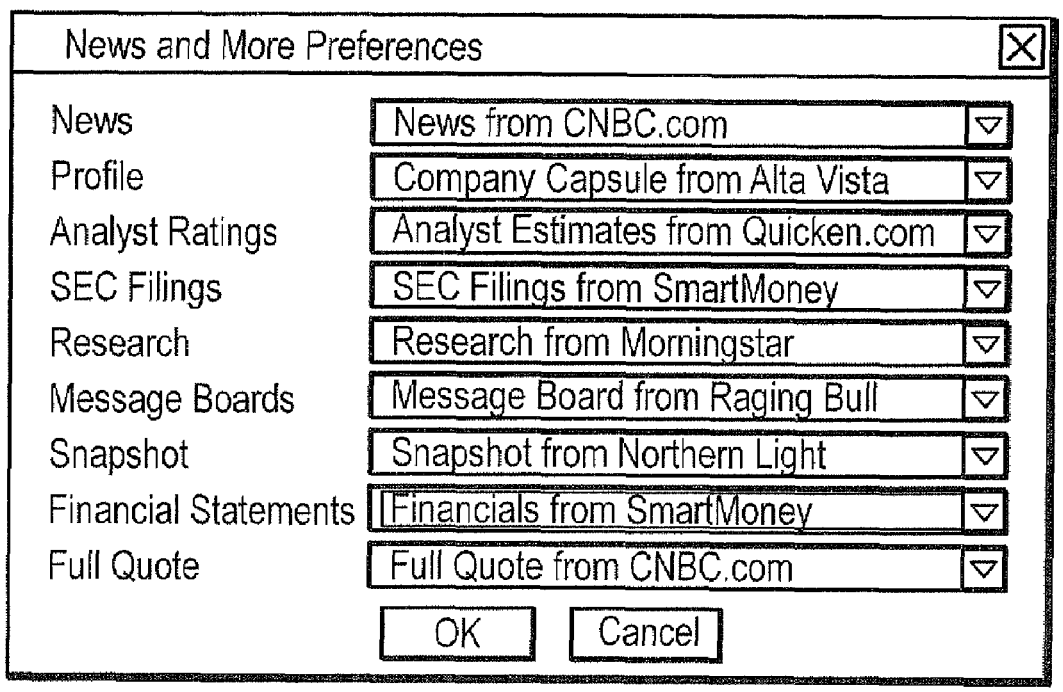
FIG. 2A(2)

FINANCIAL ANALYSIS SYSTEM INTERFACE

BACKGROUND OF THE INVENTION

The invention relates to financial analysis systems and, more particularly, to financial analysis systems which receive data in real time from external sources and which manipulate and display that data in a variety of forms. As used herein, the term "real time" should be understood to include contemporaneous data, as well as data which may in fact be delayed for relatively brief intervals, e.g., on the order of twenty minutes or so. The invention is particularly applicable to the receipt, processing and display in real time of market information with respect to a portfolio of financial instruments such as stocks, bonds, mutual funds, etc. For ease of explanation, the invention will be described with specific reference to stocks, but should be understood as being applicable to financial instruments in general.

An example of a financial analysis system that has found wide application by professional traders for portfolio and risk tracking analysis is the EXPO™ Real-Time Analytics package that has been developed by the assignee of the present invention. This package offers sophisticated capabilities for applying econometric and financial analysis to various types of monetary instruments, including stocks, bonds, and currencies, among others. For example, parameter estimation, forecasting, classification, and hypothesis testing can readily be performed by the user with the aid of predefined functions incorporated into the system. Unique user-defined functions can readily be added by the user by means of the built-in programming language. A more detailed description of the preexisting EXPO™ system is set forth more fully in the accompanying manual of appendix A entitled "Getting Started With Expo" which is incorporated herein by reference.

An important feature of financial analysis systems is the user interface. Menu selection of functions plays an important role in most such systems. This form of selection is nearly universal, but slows access to data or presentations when the user desires to switch data sources or views. Some systems allows limited rapid switching between selected elements by clicking a mouse, but none is known which employs this approach with entire portfolios of instruments. For example, in the EXPO™ system, a user that desires to obtain a Charts View of a particular stock can do so by entering the name or symbol of the stock in a window or by dragging the symbol for the stock onto an available chart window. When Charts Views of several stocks are desired, this process becomes time-consuming, especially when the user may wish to switch back and forth between numeric and Charts Views.

SUMMARY OF THE INVENTION

The EXPO™ Real-Time Analytics package has been found highly useful in the market, and has been adopted by a number of major brokerage houses and investment advisors, among others. However, like all good products, it can nonetheless be improved and the present invention does that.

In particular, in accordance with the present invention, I provide an improved interface that displays to the user a panel of selected information with respect to a portfolio of stocks. This panel, referred to herein as the Monitors View™ panel, displays in alpha-numeric form a limited amount of important data for a selected group of instruments, e.g., stocks. The data for the panel is presented in a number of windows, one for each stock, and typically includes the stock symbol, latest price, change from some prior price (e.g., the preceding day's close), and percentage change, among other items. The amount of data in a window of the panel depends on the width of the individual windows as selected by the user. In an exemplary instance described below, there are, for example, four windows placed side-by-side and several of these groups are arranged vertically as well, for a total of sixteen windows, each of which may display data for a different stock. The panel display and its associated menu and other function bars may occupy the entire screen, or only part of a screen, with a separate application such as word processing in the remainder.

The data in each window is updated in real time from sources selected by the user. These sources may comprise contract-services such as the Bloomberg® data feed, accessed through dial-up connection over a telephone line via a modem, or may comprise other sources accessible only over the Internet, e.g., Yahoo®, MSNBC®, etc. With the latter, the type and scope of data may be greatly expanded, and its cost may be greatly reduced.

Corresponding to the Monitors View™ panel, I have further provided a Charts View™ panel of similar form, but presenting data for the selected stocks in the form of charts. As was the case with the Monitors View™ panel, the size of each of the charts is determined by the number and arrangement of the individual windows of the panel. The data in the windows is a time-sequence of, for example, the price performance of a stock over a period of time, and is updated in real time as described hereinafter. Despite the fact that multiple charts are presented in this view, the user can perform a variety of functions and analyses on these charts as if only a single chart were being displayed. For example, moving averages may be added to any of the charts; ratios of one chart to another may be taken and displayed; etc.

A valuable feature of the present invention is the provision of means to rapidly switch between the Monitors View™ and Charts View™ panels. This is particularly important for professionals such as brokers and investment advisers who may closely track a group of stocks throughout the day and for whom the differing views serve different needs at various times throughout the day. In accordance with the present invention, this is accomplished by means of a single mouse click on an icon designated for that purpose. By this means, the user can instantly change between the differing views of a portfolio to examine the view he or she deems most appropriate for the moment.

A further valuable feature of the invention is the provision of rapid access to additional information with respect to the stocks in the panels. In particular, I have greatly enlarged the amount and type of information that is made available to the user, and facilitated rapid access to it. In accordance with the present invention, the user is provided the ability to rapidly access differing content, such as news, concerning a particular stock; a capsule summary of the stock; analysts' ratings of the stock; financial and other research done on the stock; message boards discussing the stock; and quotes on the stock from varying sources, among other possible items of data. In contrast to many prior systems, the added information need not all be provided from the same source, such as Bloomberg, as is commonly done. Rather, the user may designate one source for its news information, another for capsule summaries of the company underlying the stock, still another for analysts' ratings on the stock, etc. Once the initial designation is made, retrieval is transparent to the user.

Additionally, I have provided a further display that accommodates users' desire for fast access to information concerning stock prices even when the user is working in, and wishes to remain in, another application not necessarily related to financial analysis. This display, called herein the Market Bar™ view, is positioned on the screen at a location determined by the user and provides selected data on from one to several (e.g., ten) stocks selected by the user. The amount of data presented for each changes in inverse relation to the number of stocks selected for presentation. Thus, in one example, the user may select three stocks for continuous presentation on his or her screen as long as the screen is energized. As was the case with the Monitors View and Charts View panels, data concerning these stocks is updated in real time from sources selected by the user.

Accordingly, it is an object of the invention to provide an improved interface for financial analysis systems.

Further, it is an object of the invention to provide an improved interface that enables presentation of significant information in various forms concerning a group of financial instruments.

Still a further object of the invention is to provide an improved interface that facilitates retrieval and display of data in financial analysis systems.

Another object of the invention is to provide an improved interface for financial analysis systems that significantly expands the variety of types of data that may quickly be accessed from differing presentation views within the system.

Yet a further object of the invention is to enable rapid interchange between differing forms of data presentation in financial analysis systems.

DETAILED DESCRIPTION OF AN ILLUSTRATIVE EMBODIMENT

The foregoing and other and further objects and features of the invention will be more readily understood on reference to the following detailed description of the invention, when taken in conjunction with the accompanying drawings, in which:

FIG. 2A is an illustration of assignment of data preferences in accordance with the invention;

The present invention is intended for use a part of a financial analysis system which operates on a local computer at which the user is located and which communicates with remote sources of data to provide real-time updating of data. The source data for the updates are typically located on a variety of separate computer systems linked through the telephone system to form a vast computer network. The most common such network is commonly known as "the Internet" or "the web", and the invention will be described in that context, although it will be understood that it is not so limited and may be used with remote data sources of any type. Further, for ease of explanation, it is assumed that the user is operating the system with a mouse having a cursor to designate an item and a button which can be clicked to select it. It will be understood that other selectors such as keypads, digitizer tablets, and the like can be used instead.

Figure 1:
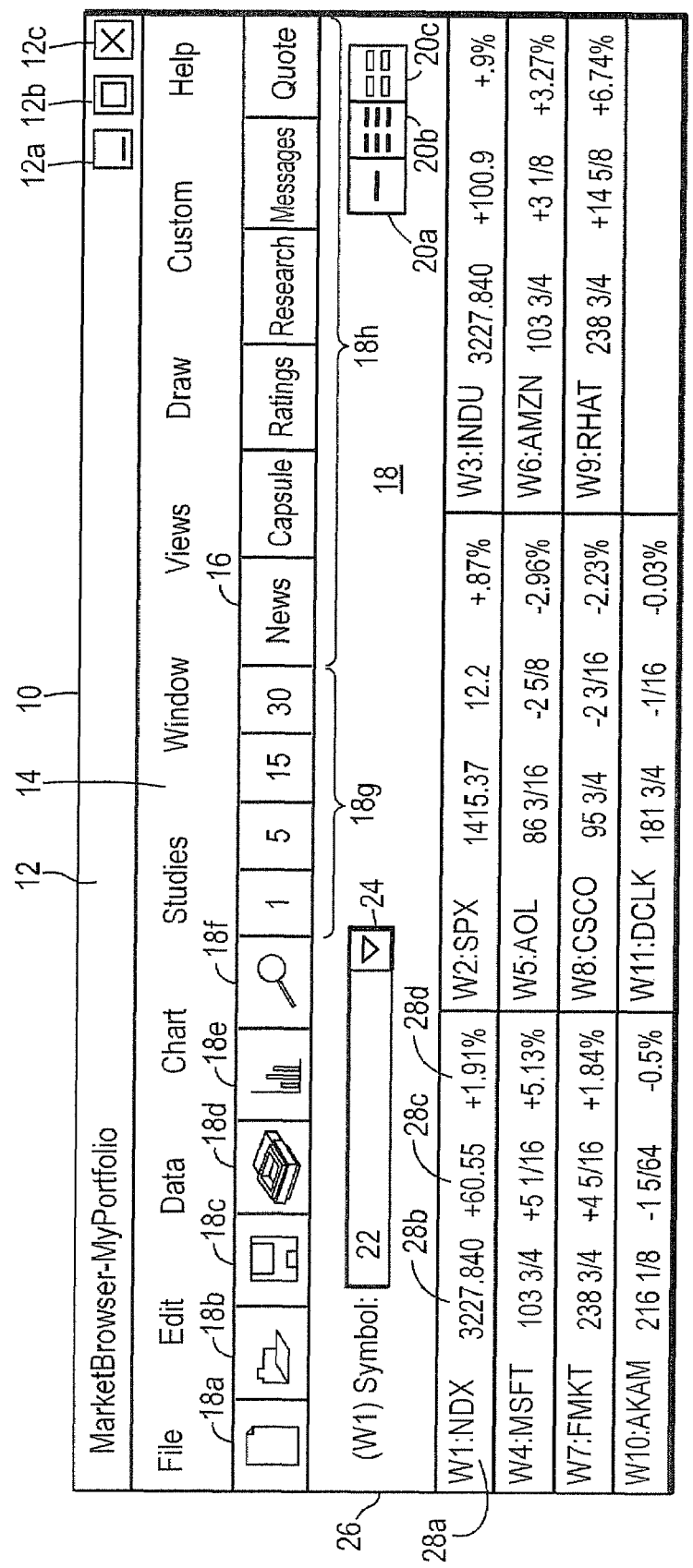
FIG. 1 is a display comprising an interface in the form of a Monitors View panel in accordance with the present invention.

Turning now specifically to FIG. 1, a preferred embodiment of a financial analysis system in accordance with the present invention includes a display 10 for presentation on a video monitor under control of a digital processor system such as a personal computer running the Windows® operating system, although the invention is not so limited. The interface may occupy the entire display area of the video screen, or it may occupy only a portion of it, as determined by the user. The interface includes a status bar 12 which identifies the specific screen being displayed at a particular instant, and which has the usual Windows "minimize", "open" and "close" buttons 12a, 12b, 12c. It further has a main menu bar 14 that contains a number of symbols such as "File", "Edit", "Data", "Chart", "Studies", "Window", "Views", "Draw", "Custom", and "Help" that enable the user to select among a wide variety of functions for further action by clicking a mouse button or other selector on the appropriate menu item. When clicked-on ("activated", "selected"), each main menu item typically displays a plurality of sub-menu items, which themselves are activated by clicking on them, the result being the performance of an action or the display of further sub-menus. For example, activation of the "Studies" button enables one to select a variety of financial functions for calculation with the data of a particular chart being displayed, e.g., moving averages, directional oscillators, volatility indicators, and a variety of others. This aspect of the display of FIG. 1 is known and specifically is used in the EXPO™ financial analysis system described above; accordingly it need not be described in further detail.

Below the main menu bar 14 is an icon bar 16 divided into a plurality of buttons 18 that can be activated by clicking on them. When activated, a block 18a establishes a new worksheet. A block 18b is used to quickly open previously stored files. A block to 18c stores the current data view, while a block 18d prints the current data view. Block 18e provides access to a variety of differing charts that may be used to display the data of interest, while block 18f enables enlargement of selected areas of a chart. Blocks 18g define the intervals at which data from a time series will be shown on a chart, e.g., at 1, 5, 15, or 30 minute intervals. Typically a number of other intervals will be provided in addition or in replacement, such as 1-day, 1-week, etc.

Block 18h provides access to several aspects of the enhanced functionality provided by the present invention. In particular, block 18h provides for retrieval and presentation of various specific types of information when one of the buttons comprising this block is activated. Thus, news concerning a particular stock is retrieved and presented when the "News" button is activated; a brief summary of the underlying issuer is obtained when the "Capsule" button is activated; stock analysts ratings are obtained via the "Ratings" button; analysts research on a particular stock is quickly retrieved when the "Research" button is activated; bulletin board messages and other gossip is retrieved when the "Messages" button is activated; and quotes from various market makers are retrieved when the "Quote" button is activated. Each of these functions is selectable when a particular stock is identified as described more fully below.

A selector bar 20 provides a window 22 into which the user may enter a particular stock for viewing. Data concerning the stock will be displayed in the window identified at 26, here, window 1 ("W1"). The window in the data will be displayed may be changed by clicking on the indicator 26 and manually entering the window desired for displaying the data for the stock identified in window 22. A window scroll indicator 24 scrolls through a list of stocks available for selection, and the user may select one of the stocks from this list for display.

Icons 20a, 20b, and 20c on selector bar 20 enable rapid switching between differing panel views. Activating icon 20a by clicking on it causes the display of the Market Bar panel; activating icon 20b causes display of the Monitors View panel; and activating icon 20c causes display of the Markets View panel. These are described more fully below. The switching could also be performed through use of one of the Window's icons 12a, 12b, 12c.

A panel of windows 28 provide the specific data display for the stocks selected to comprise the particular display. For purposes of illustration, twelve windows 28 are shown, of which eleven are occupied. Each window provides certain basic information concerning the stock it is displaying. For example, considering window 28, there is indicated at 28a the name of the window and the stock it is displaying (e.g., W1:NDX for the NASDAQ Exchange Index); at 28b the latest value of the index (or, in the case of a stock, the price of the stock); at 28c the change in value or price from a prior reference point (e.g., the prior day's closing); and at 28d the percentage change in value or price. The amount of data presented in each individual window 28 is dependent on the width allowed for each window, and thus on the number and placement of windows as selected by the user. If, for example, the windows 28 in FIG. 1 are readjusted to present two windows side-by-side and occupying the entire width of the screen; as opposed to three as shown, additional information will be presented in the respective windows.

As noted above, the financial analysis system in which the display 10 is presented is connected to one or more sources of data, typically to several different sources. Thus, a first source provides the current price information for display in the windows 28. This source may also provide the price change and percentage change data, or these may be calculated by the system itself from data stored in a cache internal to the system after its retrieval from the first source. Additionally, the same or other sources provide data for the buttons 18h. Thus, a user who desires further, more detailed information on one of the stocks displayed on display 10 first clicks on the window designator for a particular one of the stocks displayed (e.g., "W4:MSFT") to select that stock, and then clicks on one of the buttons 18h to obtain further detailed information in one of the categories designated in 18h, e.g., "News", "Capsule", etc. Each of these buttons, when activated by clicking, causes the financial analysis system to activate a web browser on the user's computer if it is not already activated, and to provide to the browser a URL that takes the user directly to the source of the desired information in accordance with selections previously made by the user. In accordance with the invention, the URL is constructed or assembled in part from syntactic data specific to the given data source to be utilized and stored in the interface system, and in part from data specific to the stock selected for further data or information reporting. The browser transmits this URL onto the Internet and fetches the requested data for display on the user's display. In the event that the user has not previously selected a specific source for the particular item of data (e.g., "News"), the financial analysis system supplies a default source.

Figure 2:
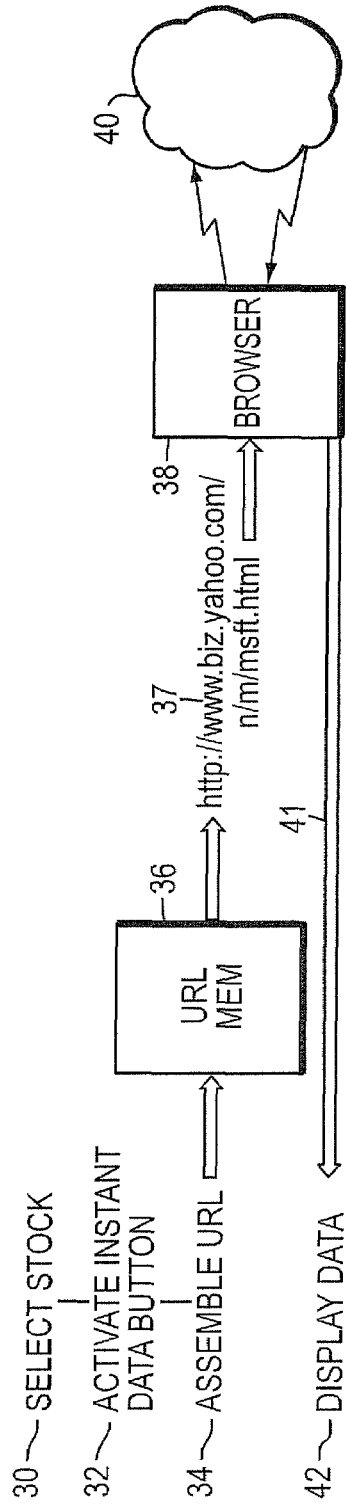
FIG. 2 is a schematic illustration of facilities for rapid information retrieval from the interface of FIGS. 1 and 3.

FIG. 2 is a flow chart summarizing this process. From a window in which the Instant Data buttons 18h are presented together with selector windows for one more stocks (as will be seen shortly, there are several such displays) the user selects a particular stock (step 30) to make it the "active" stock for that display if it has not already been activated. He or she then next selects, e.g., by clicking, (step 32) one of the Instant Data buttons 18h. This causes assembly of the URL to take place in the underlying financial analysis system. Specifically, the syntax of each of the Instant Data sources 18h is stored in memory 36. For example, for information as to a particular stock on the Yahoo news section, the URL syntax is http://www.biz.yahoo.com/n/<ticker initial>/<ticker symbol>.html. The stock-independent portion of this symbol, http://www.biz.yahoo.com/n/ is stored in URL memory 36 and the remaining portion, m/msft.html, as particularized by selection of a specific stock in step 30, is appended to the stored syntax stub to form a complete URL 37. This URL is then passed to the web browser 38 which retrieves the desired data and passes it (41) to the financial analysis system for display (step 42).

As noted above, the sources to which the browser is directed by the Instant Data buttons 18h is determined in the first instance by the user who may select among all sources available to him or her for any of the data requests. Thus, the user may designate Yahoo® as the source for each of the items associated with the Instant Data buttons; or may mix them in any manner desired, e.g., choosing Yahoo® as the data source for "News"; MSNBC® as the source for "Capsule" summaries; and so forth. These sources may all be on the Internet; may all be on some other network; may all be available only by point-to-point connection; or may be accessed through a combination of sources. In any event the data is made instantly accessible to the user in real time without time-consuming access procedures on his or her part and without distraction from focusing on the data being presented.

FIG. 2 shows a submenu provided to the user for such choices. In FIG. 2A(1), to the user may select any of the listed (for example) sources for each of the Data items 18h. Alternatively, in the sub-menu of FIG. 2A(2), the user may tailor the individual data items to differing sources as best suits his or her preferences. This provides a powerful means of data consolidation to the user.

As will be noted from the above, unlike typical financial analysis systems which obtain data only from restricted or subscription sources such as Bloomberg®, the present system enables use of widely available data sources which are offered over the Internet free of charge. Thus, the tools of a financial analysis package such as EXPO® can be accessed by users who do not have, or for whom it is not practical to contract for, access to Bloomberg® and other financial and business data sources.

Figure 3:
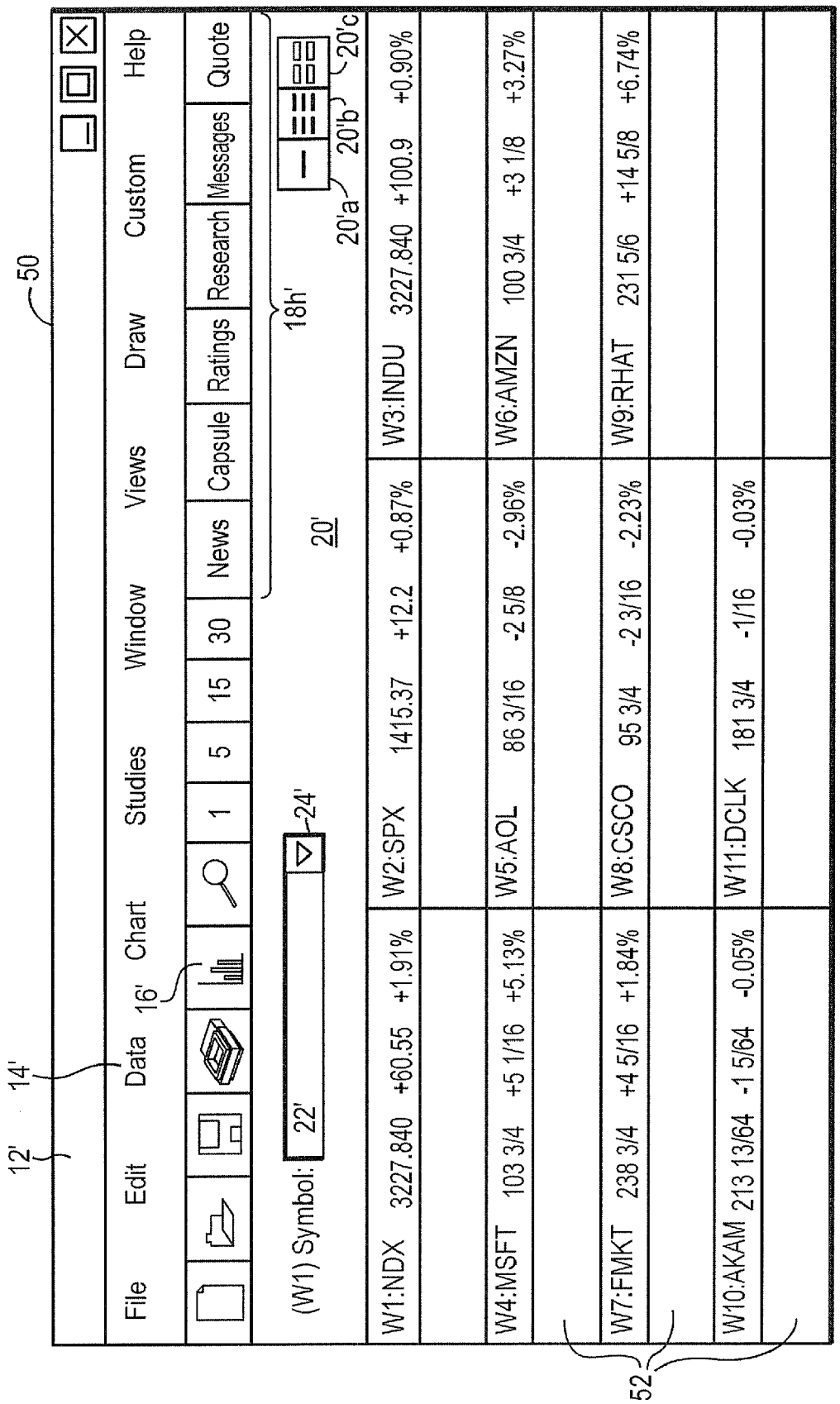
FIG. 3 is a display comprising an interface in the form of a Charts View panel in accordance with the present invention.

Turning now to FIG. 3, a display 50 has a status bar 12'; a main menu 14'; an icon bar 16'; and a selector bar 20' that correspond to the similarly-numbered items in FIG. 1 and that perform in a similar manner. In place of the Monitors View windows 28 of FIG. 1, however, the display of FIG. 2 has a corresponding plurality of windows 52 which display a small-scale chart of the stocks displayed in the Monitors View panel; this view will be referred to herein as the Charts View panel. The size of the charts is determined by the number of charts to be displayed and by the area allowed for their display. Both of these characteristics are under the control of the user.

For each chart, the wide array of functionality previously provided by the under-lying financial analysis system is available for application to the data on the respective charts even when presented in collective or portfolio form such as in FIG. 2. For example, the data may be analyzed by "Studies" such as moving averages, directional movement indicators, oscillator analysis, etc.; "Risk" calculations such as value at risk, sensitivities, and the like may be determined; and other functions may be applied.

Further, as was the case in connection with the display of FIG. 1, a user may obtain more detailed information as to a desired stock by clicking on the name of the stock in one of the windows 28 to highlight or "activate" it, and by then clicking on one of the Instant Data buttons 18h to retrieve the desired information; or by entering the symbol for a stock in the window 22', either directly or by means of the selector button 24'. The requested data is then retrieved in the manner described in connection with FIG. 2.

Figure 5:
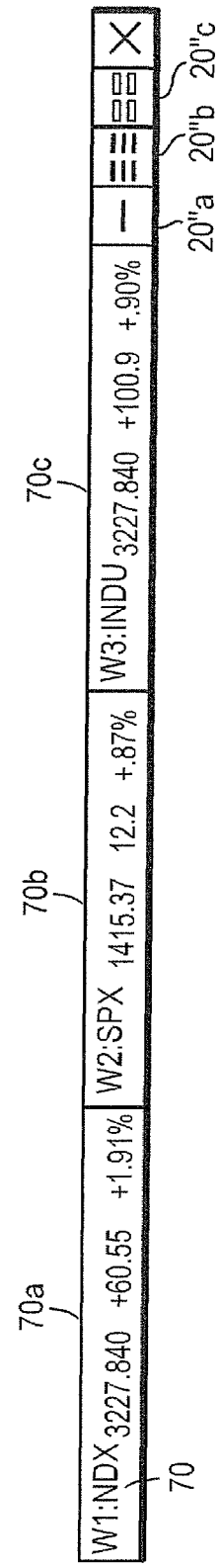
FIG. 5 is display comprising an interface in the form of a Market Bar panel in a accordance with the invention.

In accordance with a further feature of the present invention, the user can quickly switch between the various panels provided herein, i.e., the Monitors View panel, the Charts View panel, and the market Bar panel by clicking on a single one of buttons provided therefor, i.e., buttons 20*a*-20*c* in FIG. 1; buttons 20'*a*-20'*c* in FIG. 2; or buttons 20"*a*-20"*c* in FIG. 5. Thus, at each moment, the user can follow the designated portfolio of stocks with the view that provides the most appropriate form and depth of information presentation at a given time. The ability to rapidly switch panels is particularly important for active or professional traders who can thereby track price movements in their portfolio in real time via the Monitors View panel, then quickly switch to the Charts View panel to place the price movements in context. Further, from either of these panels, they can rapidly retrieve additional data such as news, possible changes in analysts' ratings, and the like, simply by selecting a particular stock in either panel (e.g., by clicking on it) and then clicking on the desired data source.

Figure 4:
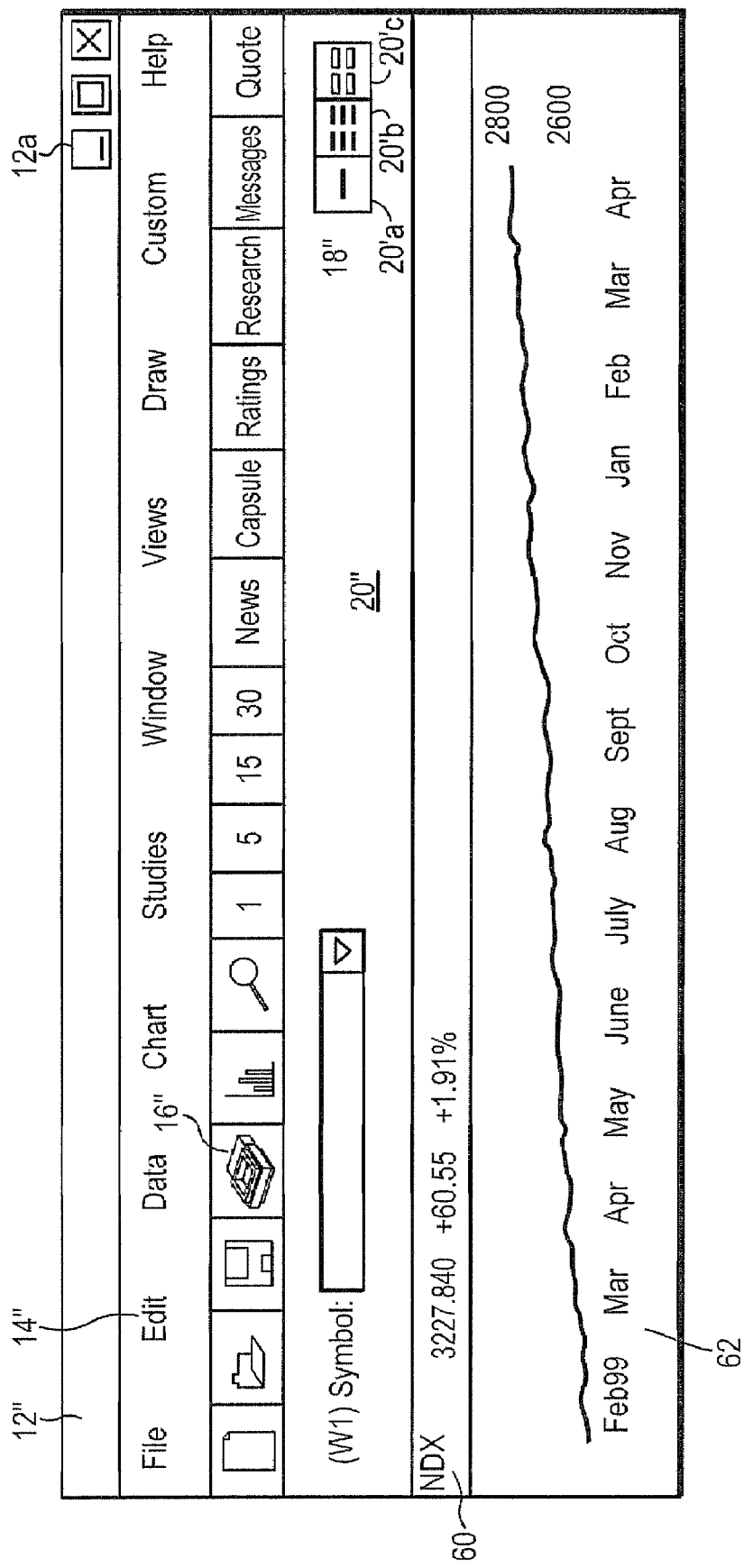
FIG. 4 is an expanded view of a chart selected from FIG. 2.

Turning now to FIG. 4, a user can obtain an enlarged chart of a given stock by clicking on the given chart in the display of FIG. 3. This brings up an enlarged version to of that chart as shown in FIG. 4, in which the status bar 12", main menu 14", icon bar 16", and selector bar 20" correspond to those of similar numbers in FIGS. 1 and 2. An identifier bar 60 displays the name or symbol of the stock being viewed, as well as current data concerning it, e.g., price, price change, percentage price change. An enlarged window 62 presents a chart of the stock itself. From this display also the user may instantly obtain additional data on the stock by clicking on one of the Instant data bars 18", as was the case with the displays of FIGS. 1 and 3. Thus, whatever the view the user has chosen, he or she may instantly access additional data concerning a particular stock through the Instant Data buttons.

The displays of FIGS. 1 through 3 typically occupy a substantial portion of the usual display screen available to the user, and may occupy the entire screen at the option of the user. This is particularly the case with the professional financial worker, whose principal focus throughout the day is on the type of presented on these displays. In many cases, however, the user may be focused primarily on other matters, and following market movements may be secondary to these at most instants. Thus the present invention provides a parcel (referred to herein as a Market Bar™ parcel) that the user may position at a desired location on a computer display screen, typically at the top or bottom, to provide limited information concerning a selected group of stocks. Such a bar is shown in FIG. 5 in which a bar in the form of a window 70 is subdivided into a plurality of regions 70*a*, 70*b*, 70*c*, as well as Monitors View icon 20"*b* and Charts View icon 20"*c*.

The user may select the number of subdivisions of the bar 70, up to some maximum number of subdivisions, e.g., ten. In accordance with the present invention, the larger the number of subdivisions the less the amount of information presented in each, and vice versa. Thus in FIG. 5, the bar 70 is divided into three subdivisions, each of which presents information identifying the subdivision window and its stock ("W1: NDX", 72*a*); the current price 72*b* of the indicated stock; its recent gain 72*c* from some reference point; and its percentage gain, 72*d*. Substantially more information can be presented for a particular stock by displaying fewer stocks in the Market Bar parcel. As was the case with the Monitors View and Charts View panels, the user can rapidly switch among these and the Market Bar panel simply by clicking on the appropriate icon.

CONCLUSION

From the foregoing it will be seen that I have provided an improved interface for financial analysis systems that facilitates real time monitoring of market conditions for a portfolio of stocks. The interface presents three different panels, at the selection of the user, providing different forms or views of data with respect to a selected portfolio of stocks or other financial instruments. The user can rapidly cycle among these by activating (clicking on) an icon that brings the user directly to the desired panel. Further, the user can quickly retrieve additional data for a given stock from any of a wide variety of sources selectable by him or her simply by activating (e.g., clicking on) an Instant Data button. Thus, the extent, type and time of data presentation is in full control of the user.

It should be understood that the foregoing description is illustrative only and of a preferred embodiment. It will be understood that the invention is not limited to the described embodiment herein, and that various changes and adaptations may be made to it without departing from the spirit or scope thereof.

What is claimed is:

1. An apparatus to display an interface for a financial analysis system comprising:
 a computer having a display screen, the computer configured to display on the display screen
  a first panel formed from a plurality of first windows stacked either vertically or horizontally or both, the first windows arranged in a non-overlapping manner such that each first window is visible simultaneously to a user, each first window configured to display therein, in alphanumeric form, financial data corresponding to one of a plurality of different financial instruments, each different financial instrument individually chosen by the user, the first windows further configured to be updated from a remote data source to display real time data therein,
  a second panel configured to correspond to the first panel, the second panel configured to be displayed when activated by a single user action, the second panel configured to present a plurality of second windows, the second windows arranged in a non-overlapping manner such that each window is visible simultaneously to the user, each second window representing a separate graphic view corresponding to one of the plurality of different financial instruments, and each second window configured to display, at least in part, the same financial data as displayed in a corresponding one of the first windows, and
  at least one icon configured to cause, when selected, retrieval from a different remote data source of additional data related to the financial data presented in the first and second panels for a selected financial instrument of the plurality of different financial instruments, the additional data retrieved by construction of a uniform resource locator (URL) including a first portion of the URL specific to the different remote data source, and a second portion of the URL specific to the selected financial instrument, the additional data retrieved by access to the constructed URL.

2. The apparatus according to claim 1 in which the computer is further configured to receive a selection from the user of the different remote data source to be associated with the at least one icon to thereby define the different remote source from which the additional data is to be retrieved on selection of the at least one icon.

3. The apparatus according to claim 2 in which the additional data is retrievable at least in part from the different remote data source over a public switched telephone network.

4. The apparatus of claim 1 wherein the computer is further configured to display on the display screen:
a plurality of user-selectable functions for analysis of financial data, wherein the user-selectable functions are selectable to operate upon the financial data corresponding to one or more of the plurality of different financial instruments.

5. The apparatus of claim 1 wherein the financial data in each first window of the plurality of first windows is updatable from a different remote data source.

6. The apparatus of claim 5 wherein at least one remote data source is accessible over the Internet.

7. The apparatus of claim 1 wherein each first window is configured to display price movements of one of the plurality of different financial instruments in alphanumeric form, and each second window is configured to display a chart graphically depicting price movements of one of the plurality of different financial instruments.

8. A computer-implemented method for operating an interface for a financial analysis system comprising the steps of:
displaying, on a display screen of a computer, a first panel formed from a plurality of first windows stacked either vertically or horizontally or both, the first windows arranged in a non-overlapping manner such that each first window is visible simultaneously to a user, each first window displaying therein, in alphanumeric form, financial data corresponding to one of a plurality of different financial instruments, each different financial instrument individually chosen by the user;
updating the first windows from a remote data source to display real time data therein;
linking the first panel to a corresponding second panel;
displaying, on the display screen of the computer, the second panel when activated by a single user action, the second panel presenting a plurality of second windows, the second windows arranged in a non-overlapping manner such that each window is visible simultaneously to the user, each second window representing a separate graphic view corresponding to one of the plurality of different financial instruments, and each second window displaying, at least in part, the same financial data as displayed in a corresponding one of the first windows;
receiving a selection of a financial instrument of the plurality of different financial instruments;
retrieving from a different remote data source additional data related to the financial data presented in the first and second panels for the selected financial instrument, the additional data retrieved by construction of a uniform resource locator (URL including a first portion of the URL specific to the different remote data source, and a second portion of the URL specific to the selected financial instrument, the additional data retrieved by accessing the constructed URL; and
displaying the additional data in a third panel, on the display screen of the computer.

9. The method of claim 8 further comprising the step of:
providing at least one user-selectable icon for retrieving the additional data, from the different remote data source data.

10. The method of claim 9, further comprising the step of:
associating the different remote data source with the at least one icon to thereby define the different remote source from which the additional data is to be retrieved on selection of the at least one icon.

11. The method of claim 8 wherein the additional data is retrieved, at least in part, from the different remote data source over a public switched telephone network.

12. The method of claim 8 further comprising the step of:
analyzing financial data in response to selection of a user-selectable function, the user selectable function causing analysis of financial data corresponding to one or more of the plurality of different financial instruments.

13. The method of claim 8 further comprising the step of:
updating the financial data in each first window of the plurality of first windows from a different remote data source.

14. The method of claim 13 wherein at least one remote data source is accessed over the Internet.

15. The method of claim 8 further comprising the steps of:
configuring each first window to display price movements of one of the plurality of different financial instruments in alphanumeric form; and
configuring each second window to display a chart graphically depicting price movements of one of the plurality of different financial instruments.

* * * * *